Figure 1:
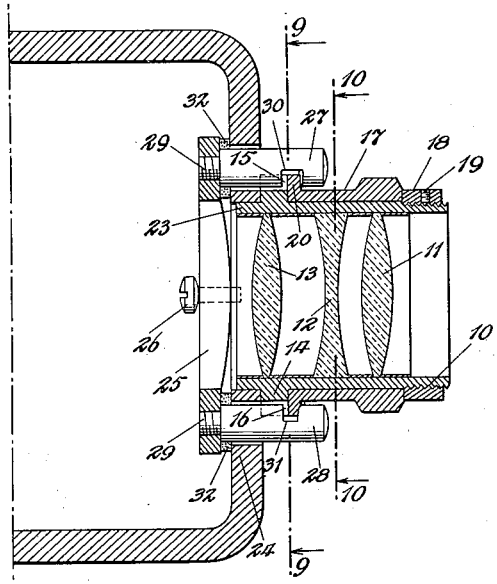

Oct. 15, 1935.    W. TAYLOR    2,017,823
LENS ATTACHING MEANS
Filed Dec. 1, 1934    2 Sheets-Sheet 1

INVENTOR
William Taylor
BY
Arthur L. Kent
his ATTORNEY

Oct. 15, 1935.                W. TAYLOR                2,017,823
                         LENS ATTACHING MEANS
                         Filed Dec. 1, 1934           2 Sheets-Sheet 2

INVENTOR
William Taylor
BY
his ATTORNEY

Patented Oct. 15, 1935

2,017,823

UNITED STATES PATENT OFFICE 2,017,823

LENS ATTACHING MEANS

William Taylor, Leicester, England, assignor to Kapella Limited, Leicester, England, a corporation of England Application December 1, 1934, Serial No. 755,540
In Great Britain December 8, 1933

13 Claims. (Cl. 88—57)

This invention relates to improvements in means for detachably attaching lenses to cameras, projectors, and other optical instruments.

It is customary to provide detachable lenses or systems of lenses for cameras and projectors, and the necessity of accurately and firmly positioning the lens mount is fully understood. It is also necessary that optical instruments, and especially cameras, shall be adapted each to be fitted with a number of different lens mounts interchangeably, and it is desirable that the means for attaching the mount to the camera or other instrument shall be such that the mount may be easily and quickly attached and removed. The present invention aims to provide an improved means for detachably attaching lens mounts to cameras and projectors and other optical instruments which shall meet all these requirements and shall be of relatively simple construction.

Means for securing a lens mount to the lens supporting member of the instrument have heretofore been provided in which claw-like protuberances on one member are engaged by a movable locking device, or latch, on the other member which coacts with the protuberances to hold an abutment surface of the lens mount against a coacting surface of the instrument member. Devices of this kind as heretofore constructed have not, however, been such as provide for those inevitable variations in the dimensions of the parts which arise in interchangeable manufacture, and one object of the present invention is to permit greater latitude in such variations.

It is desirable with any locking device, or latch, which acts like a wedge that the angle of inclination of the wedge surfaces should not greatly exceed about 10°, for otherwise it may be possible to pull the two members apart. Latches for detachably attaching lens mountings to cameras and other apparatus as hitherto constructed have been of two forms. In one the latch is moved radially into each claw; and by radially I mean that the motion is in the direction from the open end of the claw to the neck of the claw; and since the depth of the notch forming the claw is necessarily small and the angle of inclination of the wedge surface limited as aforesaid, it is difficult to manufacture such apparatus with such uniformity that in putting a variety of lenses on to the same camera the latch shall not in one case fail to enter into engagement with the claw or in another case strike the neck of the claw without wedging under the claw head. Another form of latch construction has been of the button-hole type in which a plurality of necked pins projecting from one member have entered corresponding holes in the other member and have been engaged by a movable latch plate having button-hole shaped slots in it to engage under the heads of the pins. These have not been formed as wedges; neither have they had means for securing equal pressure of engagement under the heads of the pins except either by such spring pressure as may be due to lack of flatness of the latch plate, or by means of springs which urge the members together but prevent their being rigidly held together.

According to the present invention, I am able to secure sufficient accommodation for commercial variations in the manufacture of the parts, and this I do by the following means:—In order to secure equal pressure of the latch or locking means on two spaced claws and thereby to hold the lens mount securely to the apparatus, I provide a rocking pressure-balancing means, which may be applied either to the latch or to the two claws, by which such pressures are equalized; and in order to provide a longer movement of the latch and a desirably small angle of inclination of the wedge surfaces, I so form the latch that its engaging parts, acting as wedges cooperating with the operative surfaces of the claws, are moved, not radially into the claw, but tangentially thereto, and by "tangentially" I mean across the claws in such direction that the latch cannot be obstructed by the neck or body of the claw but has a free passage past it. There is thus permitted a greater manufacturing variation in thickness of the wedging parts of the latch, in height of the claws, and in other details of construction.

Other features and advantages of the invention will appear from the following detailed description in connection with the accompanying drawings showing approved embodiments of the invention.

Figure 2:
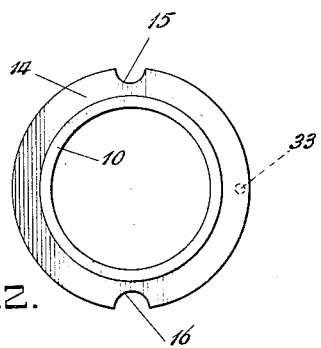
Figure 3:
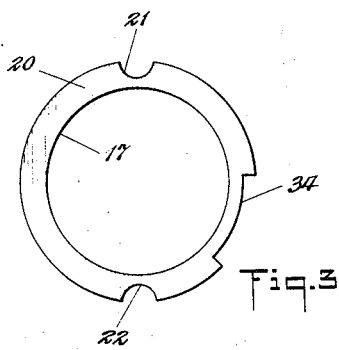
Figure 4:
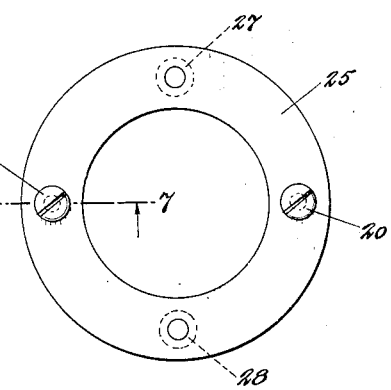
Figure 5:
Figure 6:
Figure 2:
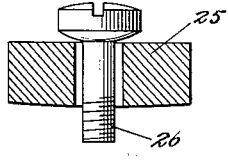
Figure 8:
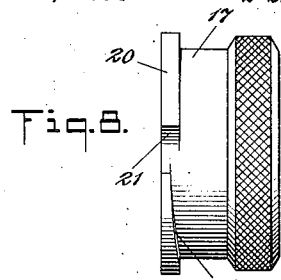
Figure 12:
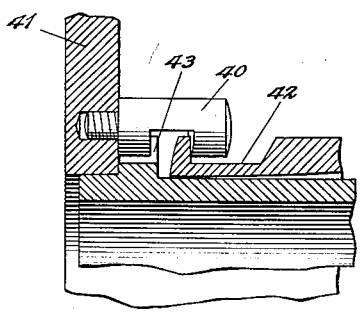
Figure 9:
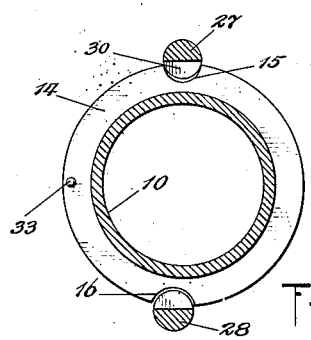
Figure 10:
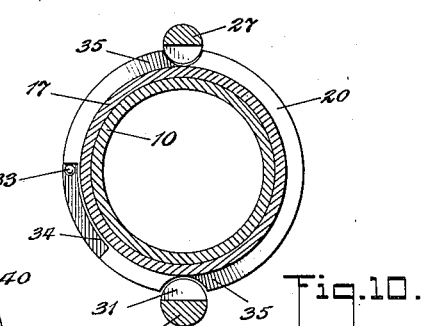
Figure 11:
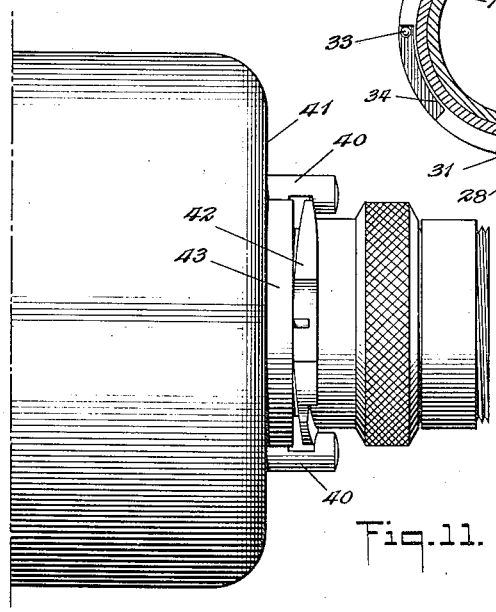

In the drawings:

Fig. 1 is a longitudinal central section illustrating a lens tube carrying a lens combination, attached to the front of a camera or projector, only a part of which is shown;

Fig. 2, a rear end elevation of the lens tube and accompanying parts;

Fig. 3, a rear end elevation of the locking device in the form of a ring;

Fig. 4, a rear elevation of the rocking annulus;

Fig. 5, a detail side elevation of a rocking annulus with a cylindrical rocking surface on its outer face;

Fig. 6, a detail side elevation of a modified form of rocking annulus;

Fig. 7, a detail sectional view of a rocking annulus, with one screw in elevation;

Fig. 8 is a side elevation of the locking ring;

Fig. 9, a transverse section on the line 9—9, Fig. 1, but showing the posts unsymmetrical;

Fig. 10, a transverse section on the line 10—10, of Fig. 1, but with the locking ring in unlocked position and showing a modification having one post wider than the other;

Fig. 11, a side elevation of an objective and part of a camera or projector, illustrating a modification of the invention; and Fig. 12, a detail sectional view of such modification.

Referring to Figs. 1 to 10 of the drawings, 10 is a lens tube of the usual cylindrical form within which may be secured any desired lens or lens combination. In the example shown a lens combination is diagrammatically disclosed, this consisting of the usual lenses 11, 12 and 13 held in the tube and properly spaced apart.

At a short distance from its rear end, the tube 10 is provided with an outward projecting flange 14 which may be termed the positioning flange, since it determines the position of the lens tube relative to the front of the camera or projector. This positioning flange 14 has two notches 15 and 16. These notches are located at opposite ends of a diameter of the flange 14. The lens tube also is provided with a latch, or locking device, 17, this device being laterally movable relative to the tube. In the best embodiment of the invention, this locking device is formed as a ring rotatably mounted on the lens tube, and held against movement in the direction of the lens axis by the positioning flange 14 and by a collar 18 secured to the lens tube in any suitable way, as for example, by threading the tube and collar, the threads fitting snugly, so that there will be no chance of the collar rotating accidentally. In addition, the collar 18 may be provided with a set screw 19, as shown in Fig. 1.

The locking ring 17 has an outward-extending flange 20, whose diameter is conveniently made about equal to that of the positioning flange 14, and which is provided with two notches 21 and 22 substantially diametrically opposite each other. One side of the flange 20 of the locking-ring may be a plane surface at right angles to the lens axis, the other side of the flange having diametrically opposite portions inclined circumferentially to act as wedges as hereinafter described.

That part of the lens tube which extends beyond the inner face of the positioning flange 14 serves as a spigot end indicated at 23, which enters and fits easily, but not too loosely, in a circular opening in a metal front plate 24 carried by, or forming part of, the camera or projector. Around this circular opening on the inside of the front plate 24, is placed a rocking device, in the present example formed as an annulus 25, Fig. 4, whose front surface, which is adjacent the inner face of the front plate 24, is not one plane surface at right angles to the lens axis, but is so formed that the annulus may rock or tilt in either direction about an axis transverse to the lens axis, this transverse axis, most advantageously, being a diameter of the annulus. In order to provide for the rocking or tilting of the annulus 25, its front face may be either a cylindrical surface with the axis of the cylinder parallel to the above-mentioned diameter of the annulus, as shown in Fig. 5, or two sloping plane surfaces extending each way from said diameter of the annulus, the two plane surfaces being arranged to form a dihedral angle, as shown in Fig. 6. It will be seen that by this construction the annulus, measured in the direction of the lens axis, is thicker at one diametrical plane than at any other such plane, and hence, when put in place against the inside of the front plate 24, will touch the latter only along the diametrical axis on which it tilts and rocks.

The annulus 25 may be held in place against the inside of the front plate 24 in any suitable way to allow a slight rocking and tilting of the annulus. One convenient way is to provide the annulus with two holes, one at each end of a diameter, at the thickest portion of the annulus, through which holes screws 26 are inserted and threaded into the front plate 24, the undersides of the heads of these screws being given a clearance, as, for example, by rounding them to make their inner surfaces generally spherical, as shown in Fig. 7. This, with the fact that the screws do not fit tightly in the respective holes, permits the annulus to be rocked while at the same time being held to the front plate. The holes may be cushioned with linings of felt or rubber, if desired.

On the diameter of the rocking annulus at right angles to the diameter of its thickest part, two locking posts or studs, 27 and 28, are secured in any suitable way, so as to have their longitudinal axes at right angles to the inner plane face of the annulus. In the example illustrated, each post has a threaded end 29 of reduced diameter which is screwed into a threaded hole in the annulus, whereby the post is held rigidly to the rocking annulus. The posts pass through openings in the front plate, and extend forward beyond such front plate, outside the camera or projector. Near their front ends the posts are provided with notches, 30 and 31 respectively, facing toward the lens axis. Packing rings 32 of felt or other suitable material serve to prevent entrance of light through the post holes without interfering with the movement of the posts and rocking annulus.

In putting the lens mount in place on a camera or projector, it is positioned so that the respective notches 15 and 16 in the positioning flange 14, and the corresponding notches 21 and 22 in the flange 20 of the locking ring 17 are in alinement with the corresponding posts 27 and 28. Then the lens tube is pushed into place, the spigot end 23 entering the circular opening in the front plate 24. Then the locking ring is rotated so as to turn its notches out of alinement with the posts 27 and 28, whereupon the flange 20 of the locking ring enters the notches in the posts to lock the lens mount against removal. To aid in conveniently positioning the locking ring with its notches alined with the corresponding notches in the flange 14, a pin 33 projects from the flange 14 into a peripheral recess 34 in the flange of the locking ring, the pin being positioned to engage the end of the recess when the notches are alined and the recess being of sufficient length to permit the desired turning movement of the ring.

For the purpose of drawing the lens mount firmly into position so that the inner face, or abutment surface, of the positioning flange 14 will seat itself firmly against the abutment surface of the front plate 24, the portions of the flange of the locking ring which coact with the notched posts, or claws, 27 and 28 are formed to act as wedges to coact with the engaging surfaces of the claws, that is, the front inwardly facing walls of the notches 30 and 31. In the example illustrated, the portions of the front surface of the flange 20 which engage the claws are inclined circumferentially at a slight angle helically with respect to the longitudinal axis of the ring, as shown at 35 in Figs. 8 and 10, and the engaging surfaces of the claws are correspondingly inclined as shown. These cam surfaces in any section radially of the longitudinal axis of the ring extend at right angles to such axis.

When the locking ring 17 is rotated, its wedging action against the claws causes the positioning flange 14 to be pressed firmly against the front plate. But owing to the fact that each camera may be provided with any one of a number of different lens mounts or may have to receive a number of different lens mounts interchangeably, and that it is commercially impractical to make different lens mounts so exact replicas of one another that the cam surfaces of the two posts, or claws, will be engaged equally by the locking ring flange, when the locking ring flange is wedged firmly between the positioning flange and one of the claws it may be loose or not firmly wedged between the positioning flange and the other claw, so that the lens mount is not rigidly secured. This unequal engagement of the locking ring with the claws and resulting unequal pressure against the positioning flange is avoided in the construction shown, since, due to the rocking annulus 25, equal engagement and tight holding pressure are obtained on both sides of the lens tube. As the rocking annulus tilts, the claws are swung with the annulus in opposite directions, one moving forward and the other backward until they engage the locking ring equally. Differences in clearances between the various parts due to the usual slight variations in manufacture are thus taken up.

Most desirably, one of the two notches 15 and 16 in the positioning flange 14 is made to fit its post snugly in order to properly position the lens tube rotationally, while the other notch is given more clearance about its post. In the example shown in Fig. 9 of the drawings the notch 15 fits its post 27 closely, whereas the notch 16 is large enough to provide a little clearance for the post 29. This avoids the high accuracy of manufacture which would be necessary if both notches in the positioning ring were intended to fit their respective posts closely.

In devices of this kind it is an advantage if the construction is such that the lens tube can be put in place in only one way, that is, cannot be rotated 180° so as to bring the notch for one post in alinement with the other post. One way of obtaining the desired advantage is to have the two posts 27 and 28 unsymmetrical about the lens tube, as shown in Fig. 9, and, if desired, this may be done, provided the amount of displacement from true symmetry is not great. Another way of accomplishing this result is to make one post wider than the other, the notches being correspondingly dimensioned so that the smaller notch cannot receive the wider post. This has the advantage over the preceding arrangement that the stresses are accurately distributed opposite each other. In the example shown in the drawings, Fig. 10, the post 28 is wider than the post 27, and thus too large to enter the notch 15 in the positioning flange, but will enter the wider notch 16. Hence, the user can attach the objective to the camera or projector in one way only.

By making only a slight incline to the wedge-like surfaces of the flange of the locking ring and to the cam surfaces of the posts, the locking ring will not slip or turn backward to release its flange from the posts. The posts may be of any desired cross-section. In the present example they are shown as circular. The locking ring may be knurled if desired, or otherwise made so that it may be turned readily.

While it is particularly advantageous to make the rocking annulus 25 of metal of such dimensions that it is substantially rigid, yet, in some cases it may be made as a somewhat resilient member which will yield to substantially equalize the pressures between the locking ring and the posts and also to limit such pressures.

To put a lens mount in place on the camera or projector it is only necessary to arrange the locking ring with its notches in alinement with the corresponding notches in the positioning flange, and then bring the alined notches in alinement with the corresponding posts or studs and push the lens mount toward the camera or projector until the inner face of the positioning ring contacts with the outer face of the front plate. A relatively small angular movement of the locking ring serves to connect the lens mount to the posts and a further additional movement serves to press the positioning flange of the mount firmly against the face plate so as to secure the lens mount rigidly to the camera. To remove the lens mount from the camera or projector, the locking ring is rotated to its unlocking position where it is stopped by the pin 33 with its notches alined with the posts and the notches of the positioning flange, and then the mount can be drawn away from the camera or projector. Owing to the compactness of the construction, it is possible to attach or remove the objective by using one hand only.

Instead of employing a rocking member on the inside of the camera or projector, as in the construction hereinbefore described, the posts or claws may be secured rigidly with relation to the front plate and the locking ring or other latch device may be modified to perform the function of a rocking member. Such a modification of the invention is illustrated in Figs. 11 and 12. In this construction the locking posts indicated at 40 are secured rigidly to the front plate 41 and the locking ring 42 is arranged to rock on the front surface of the positioning flange 43, by making the rear face of the locking ring either as a convex cylindrical surface or as two plane surfaces sloping away from each other toward the outside, in the manner already shown and described in connection with the front surface of the rocking annulus of the first form of the invention. With this modification, the locking ring is somewhat loosely fitted to the lens tube preferably by being slightly flared internally as shown so that it may tilt or rock slightly. It is important so to construct the locking ring that the diametrical rocking or tilting axis which makes contact with the front surface of the positioning flange 43, will be substantially at right angles to that diameter of the locking ring which passes through the two posts when the locking ring has been turned into locking position.

The manner of attaching and detaching a lens mount employing this modification is the same as already described in connection with the first form of the invention.

It is to be kept in mind that the amount of rocking of the rocking annulus in the first form of the invention or of the rocking locking ring in the modification just described is very small, since a very slight movement is all that is necessary to bring about an equalization of the stresses on the two posts. It will be seen that the rocking balancing means is such that it is non-adjustable, so that its equalizing operation will not be changed by the user or by wear of the parts.

While the "claws" of the illustrated embodiment of the invention are formed by two posts having notches therein, it is obvious that the essential part of such a "claw" is the overhanging surface which is engaged by the latch and the neck or body part from which such surface extends, which is attached to the camera or other instrument, or to the lens mount, as the case may be, and past which the engaging part of the latch moves tangentially. It is further obvious that the neck or body portion of such claws may have any convenient form or extent. The word "claw" as used in the claims is, therefore, to be understood as including any part providing such essential overhanging engaging surface and support therefor.

What is claimed is:

1. Means for detachably attaching a lens member to an apparatus member, said members having coacting positioning abutment surfaces, said means comprising two claws on one of said members on opposite sides of the lens axis, and a latch movable on the other of said members and having claw-engaging parts which move tangentially of the claws and are formed to act as wedges to force the abutment surfaces of said members together, and rocking means for equalizing the pressures between the engaging surfaces of the claws and the latch.

2. Means for detachably attaching a lens member to an apparatus member, said members having coacting positioning abutment surfaces, said means comprising two claws on one of said members on opposite sides of the lens axis, and an annular locking member rotatably mounted on the other of said members and having claw-engaging portions extending circumferentially thereof and which move tangentially of the claws and which are formed to act as wedges to force the abutment surfaces of said members together, and rocking means for equalizing the pressures between the engaging surfaces of the claws and the locking member.

3. Means for detachably attaching a lens tube to an apparatus member, the lens tube and the apparatus member having coacting positioning abutment surfaces, said means comprising two claws on the apparatus member on opposite sides of the lens axis, and a latch movable on the lens tube and having claw-engaging parts which move tangentially of the claws and are formed to act as wedges to force the abutment surface of the lens tube against the apparatus member, and rocking means for equalizing the pressures between the engaging surfaces of the claws and the latch.

4. Means for detachably attaching a lens tube to an optical instrument, the lens tube having a positioning abutment surface to coact with a surface on the instrument, said means comprising two claws on the instrument on opposite sides of the lens axis, and a locking ring rotatable on the lens tube and having circumferentially extending flange portions to move tangentially of the claws in engagement therewith, said flange portions being formed to coact with the claws as wedges to force the abutment surface of the lens tube against the abutment surface of the instrument.

5. Means for detachably attaching a lens tube to an optical instrument, the lens tube having a positioning abutment surface to coact with a surface on the instrument, said means comprising two claws on the instrument on opposite sides of the lens axis, and a locking ring rotatable on the lens tube and having circumferentially extending flange portions to move tangentially of the claws in engagement therewith, said flange portions being formed to coact with the claws as wedges to force the abutment surface of the lens tube against the abutment surface of the instrument, and rocking means for equalizing the pressure between the engaging surfaces of the claws and the locking ring.

6. In a device for attaching a lens to a camera or projector having a front plate, the combination, with said front plate having an opening, a lens tube having a positioning flange adapted to contact with the front plate, said flange having a pair of notches, and a pair of posts projecting forward beyond the front plate and arranged to pass through said notches, of means carried by the lens tube for engaging the projecting ends of both posts and transmitting pressure to the outer face of the positioning flange, and means for holding the inner ends of said posts to the camera, one of said two means being arranged to tilt or rock to maintain substantially uniform pressure on the two posts.

7. In a device for attaching a lens to a camera or projector having a front plate, the combination, with said front plate having an opening, a lens tube having a positioning flange adapted to contact with the front plate, said flange having a pair of notches, and a pair of posts projecting forward beyond the front plate and arranged to pass through said notches, each of said posts having a notch facing toward the lens axis, of a locking ring rotatable on the lens tube and having a notched flange arranged to move through the notches in the posts and having its notch-engaging portions formed to act as wedges, whereby, by rotation of the locking ring and engagement of it in the notches of the posts, pressure is exerted against each post to press the positioning flange against the front plate, and means for equalizing the pressure on the two posts.

8. In a device for attaching a lens to a camera or projector having a front plate, the combination, with said front plate having an opening, a lens tube having a spigot-end to enter said opening, a positioning flange on said lens tube adapted to contact with the front plate, said flange having a pair of notches, and a pair of posts projecting forward beyond the front plate and arranged to pass through said notches, each of said posts having a notch facing toward the lens axis, of a locking ring rotatable on the lens tube in engagement with the positioning flange and having a notched flange arranged to enter and move through the notches in the posts, the front face of said flange having inclined surfaces arranged to give a cam action against the forward walls of the notches in the posts, whereby pressure is exerted against each post to press the positioning flange against the front plate, and means for equalizing the pressure on the two posts.

9. In a device for attaching a lens to a camera or projector having a front plate, the combination, with said front plate having an opening, a lens tube having a spigot-end to enter said opening, a positioning flange on the lens tube adapted to contact with the front plate, said flange having a pair of notches, and a pair of posts projecting forward beyond the front plate and arranged to pass through said notches, each of said posts having a notch facing toward the lens axis, of a locking ring rotatable on the lens tube and having a notched flange arranged to move through the notches in the posts and having its notch-engaging portions formed to act as wedges, whereby, by rotation of the locking ring and engagement of it in the notches of the posts, pressure is exerted against each post to press the positioning flange against the front plate, and a balancing means for equalizing the pressure on the two posts.

10. In a device for attaching a lens to a camera or projector having a front plate, the combination, with said front plate having an opening, a lens tube having a positioning flange adapted to contact with the front plate, said flange having a pair of notches, and a pair of posts projecting forward beyond the front plate and arranged to pass through said notches, each of said posts having a notch facing toward the lens axis, of a locking ring rotatable on the lens tube and having a notched flange arranged to move through the notches in the posts and having its notch-engaging portions formed to act as wedges, whereby, by rotation of the locking ring and engagement of it in the notches of the posts, pressure is exerted on each post to press the positioning flange against the front plate, and a rocking device arranged to engage the rear ends of the posts and transmit a reaction through the front plate, whereby the pressures on the two posts are equalized.

11. In a device for attaching a lens to a camera or projector having a front plate, the combination, with said front plate having an opening, a lens tube having a spigot-end to enter said opening, and a positioning flange on the lens tube adapted to contact with the front plate, said flange having a pair of notches, of a rocking annulus inside the front plate and arranged to rock thereon, a pair of posts connected to the rocking annulus along a diameter thereof at substantially equal distances from the center of the annulus, said posts projecting forward beyond the front plate and being arranged to pass through said notches, and locking means on the lens tube for engaging the projecting ends of both posts and transmitting pressures to urge the positioning flange against said front plate.

12. In a device for attaching a lens to a camera or projector having a front plate, the combination with said front plate having an opening, a lens tube having a spigot-end to enter said opening, and a positioning flange on the lens tube adapted to contact with the front plate, said flange having a pair of notches, of a rocking annulus inside the front plate and arranged to rock thereon, a pair of posts connected to the rocking annulus along a diameter thereof at substantially equal distances from the center of the annulus, said posts projecting forward beyond the front plate and being arranged to pass through said notches, each of said posts having a notch facing toward the lens axis, and a locking ring rotatably mounted on the lens tube and having a notched flange arranged to move through the notches in the posts and having its notch-engaging portions formed to act as wedges between the posts and the lens tube to press the positioning flange against said front plate.

13. In a device for attaching a lens to a camera or projector having a front plate, the combination, with said front plate having an opening, a lens tube having a positioning flange adapted to contact with the front plate, said flange having a pair of notches, and a pair of posts extending forward from the front plate, each post having a notch facing toward the lens axis, of a locking-ring rotatably mounted on the lens tube and rockable thereon and having a notched flange formed to enter the notches in the posts and to produce and transmit pressure to urge the positioning flange against said front plate, the rear face of said locking-ring flange being formed to rock on the face of the positioning flange.

WILLIAM TAYLOR.